United States Patent [19]

Furuya

[11] Patent Number: 5,284,108
[45] Date of Patent: Feb. 8, 1994

[54] DISPLAY DEVICE FOR A VEHICLE

[75] Inventor: Yoshiyuki Furuya, Shizuoka, Japan

[73] Assignee: Yazaki Corporation, Tokyo, Japan

[21] Appl. No.: 899,289

[22] Filed: Jun. 16, 1992

[30] Foreign Application Priority Data

Jul. 1, 1991 [JP] Japan .................. 3-160294

[51] Int. Cl.⁵ .................. G01D 11/28; F21V 9/14
[52] U.S. Cl. .................. 116/286; 116/327; 368/228; 368/233; 362/19; 362/23
[58] Field of Search .................. 116/62.1, 62.4, 284, 116/286, 298, DIG. 36; 368/233, 234, 223, 227, 228; 362/19, 23, 28, 29, 268, 293

[56] References Cited

U.S. PATENT DOCUMENTS

| | | | |
|---|---|---|---|
| 1,847,903 | 3/1932 | Schubert | 116/286 X |
| 2,202,581 | 5/1940 | Hammer | 368/233 |
| 2,412,074 | 12/1946 | Benford | 362/19 X |
| 2,454,280 | 11/1948 | Hardesty | 116/286 X |
| 2,482,410 | 9/1949 | Gaetjens | 116/286 X |
| 2,511,010 | 6/1950 | Rohr | 116/286 X |
| 2,603,129 | 7/1952 | Dreyer | 116/286 X |
| 3,389,678 | 6/1968 | Fenwick | 116/284 |
| 3,511,211 | 5/1970 | Horne et al. | 116/286 |
| 3,538,322 | 11/1970 | Arsem | 362/19 |
| 3,921,569 | 11/1975 | Miller et al. | 116/129 P |
| 3,971,928 | 7/1976 | Kirsch et al. | 368/227 X |
| 4,206,592 | 6/1980 | Maue | 368/233 |
| 5,161,480 | 11/1992 | Furuya et al. | 116/62.1 |

FOREIGN PATENT DOCUMENTS

| | | |
|---|---|---|
| 3237883 | 4/1984 | Fed. Rep. of Germany . |
| 3704574 | 8/1987 | Fed. Rep. of Germany . |
| 1073168 | 9/1954 | France . |
| 0035320 | 2/1989 | Japan .................. 116/286 |
| 4-223220 | 8/1992 | Japan .................. 362/23 |
| 4-223221 | 8/1992 | Japan .................. 362/23 |
| 4-303710 | 10/1992 | Japan .................. 362/23 |

*Primary Examiner*—William A. Cuchlinski, Jr.
*Assistant Examiner*—John L. Beres
*Attorney, Agent, or Firm*—Sughrue, Mion, Zinn, Macpeak & Seas

[57] ABSTRACT

An object of the present invention is to provide a display device for a vehicle which assures that visual recognizability can be improved by using a circular disc-shaped pointer while the pointer and characters, calibrations or the like on a dial overlap each other. A circular disc-shaped pointer composed of a polarized plate and including a slit-shaped indicating portion radially extending from the central part and the outer peripheral part of the pointer is arranged in front of a dial composed of a polarizing plate and having characters, calibrations or the like placed thereon. In addition, a light source is arranged behind the dial so as to illuminate the pointer with the light beam emitted therefrom. A movement is disposed at the central part of the light source to turn the pointer. The polarizing direction of the dial and the polarizing direction of the pointer are determined such that the light beam emitted from the light source permeates through the limited region where the characters, calibrations or the like on the dial overlap the indicating portion 1a of the pointer.

6 Claims, 10 Drawing Sheets

DISPLAY DEVICE FOR A VEHICLE

BACKGROUND OF THE INVENTION

The present invention relates generally to a display device for a vehicle. More particularly, the present invention relates to a display device for a vehicle wherein a pointer is constructed in the circular disc-shaped configuration including a slit-shaped indicating portion extending from the central part toward the outer peripheral part thereof, characters, calibrations or the like on a dial are covered with the outer peripheral part of the pointer, and the dial is illuminated with the light beam emitted from the backside of the dial.

Figure 15:
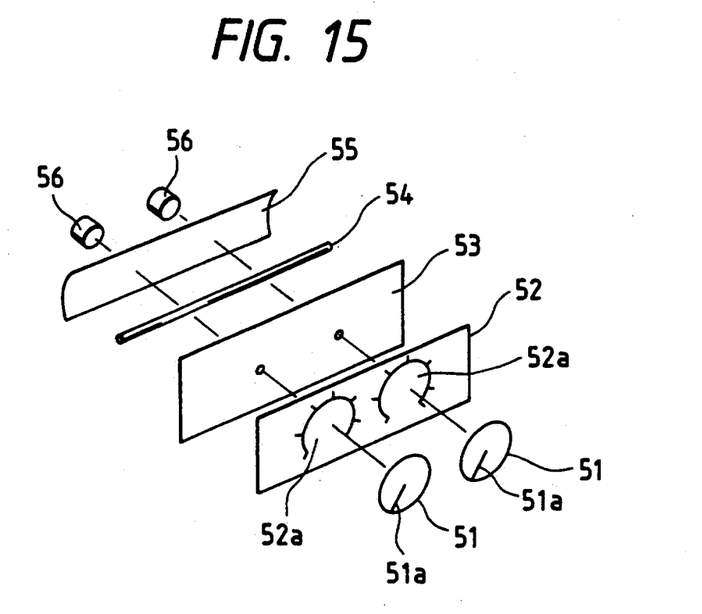
FIG. 15 is a perspective view of a conventional display device for a vehicle, particularly illustrating essential components for the display device in the disassembled state.

Usually, a needle-shaped pointer or a circular disc-shaped pointer has been hitherto used as a pointer for, e.g., a speed meter, a tachometer or the like each adapted to display in the analogical manner. FIG. 15 is a perspective view which schematically illustrates by way of example a conventional display device for a vehicle including a circular disc-shaped pointer. The display device includes pointers 51 each of which is constructed of a circular disc-shaped plate having no light permeability, and each pointer 51 includes a slit-shaped indicating portion 51a which radially extends from the central part toward the outer peripheral part of the pointer 51. In addition, a dial 52 is arranged behind the pointers 51, and circular portions 52a each having light permeability and dimensions to substantially correspond to the circular shape of each pointer 51 are formed on the dial 52. Characters, calibrations or the like each having light permeability are placed around the outer periphery of each circular portion 52a.

In addition, a light scattering plate 53, a cathode tube 54, a reflective plate 55 and movements 56 for driving the pointers 51 are successively arranged behind the dial 52. When the cathode tube 54 serving as a light source is turned on, the light beam emitted from the cathode tube 54 directly reaches the light scattering plate 53 or it is once reflected from the reflective plate 55 and then reaches the light scattering plate 53. Thereafter, the dial 52 and the pointers 51 are illuminated with the light beam which has been irregularly scattered in the scattering plate 53. With such construction, the indicating portions 51a of the pointers 51 each having light permeability and the characters, calibrations or the like on the pointer 51 each having light permeability are brightly illuminated with the light beam. The display device including slit-shaped indicating portions on circular disc-shaped pointers as constructed in the above-described manner has a merit that a single light source serves not only for the dial but also for the pointer.

Figure 16:
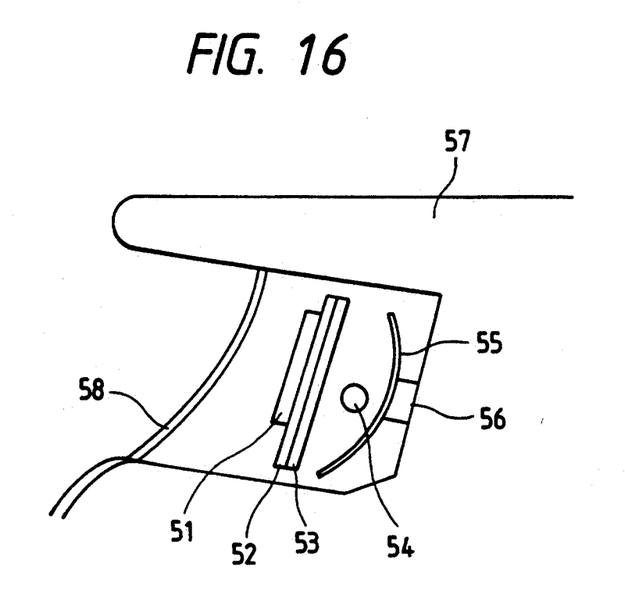
FIG. 16 is a fragmentary side view of the display device shown in FIG. 15, particularly illustrating the state that the display device is incorporated in an instrument panel on the vehicle.
Figure 17:
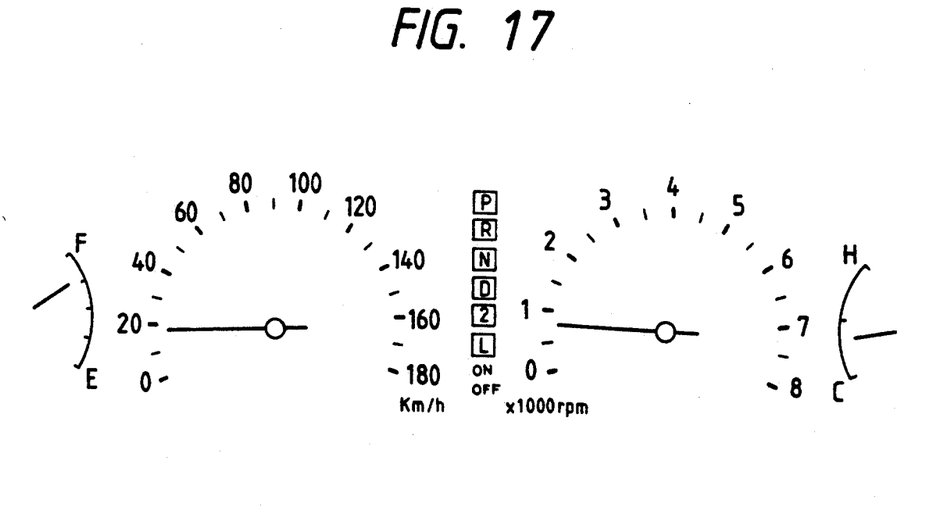
FIG. 17 is a diagrammatical view of the display device shown in FIG. 15.

FIG. 16 is a fragmentary view which illustrates that the aforementioned display device is incorporated in an instrument panel 57 on a vehicle. In the drawing, reference numeral 58 designates a meter hood and reference numeral 59 designates a front glass. In addition, FIG. 17 is a diagrammatical view which illustrates from the front side the state that a light source for the display device is turned on. As is apparent from the drawing, characters, calibrations or the like are brightly illuminated with the light beam emitted from the light source so that they can clearly visually be recognized by driver's eyes.

Among many meters mounted on a modern vehicle, some of them have two separate light source systems, one of them being operable for illuminating a pointer and the other one being operable for illuminating a dial. In this case, calibrations are placed outside of characters, and a pointer is arranged such that it extends to the calibrations while overlapping the characters. As shown in FIG. 17, however, the foremost end of the indicating portion 51a reaches only the inside of the region where the characters, calibrations or the like are placed. For this reason, the indicating portion 51a of the pointer 51 cannot overlap the characters, calibrations or the like. Thus, there appear problems to be solved. Specifically, visual recognization is accomplished with much difficulties, and moreover, a degree of freedom of designing is restrictively determined.

SUMMARY OF THE INVENTION

The present invention has been made in consideration of the foregoing problems to be solved and its object resides in providing a display device for a vehicle which assures that visual recognization can be improved by using a circular disc-shaped pointer while the pointer overlaps characters, calibrations or the like on a dial.

According to the first aspect of the present invention, there is provided a display device for a vehicle including a dial having characters, calibrations or the like placed thereon, a circular disc-shaped pointer arranged in front of the dial to cover the characters, calibrations or the like on the dial with the outer peripheral part and including a slit-shaped indicating portion radially extending from the central part to the outer peripheral part thereof, a light source arranged behind the dial to illuminate the dial and the pointer with the light beam emitted from the light source, and a driving section for turning the pointer, wherein the display device includes that the pointer is constructed of a polarizing plate having a predetermined polarizing direction exclusive of the indicating portion of the pointer, that a part of the dial overlapped by the pointer is constructed of a polarizing plate having a predetermined polarizing direction exclusive of the part corresponding to the characters, calibrations or the like and that the light emitted from the light source permeates through the region inclusive of the position where the characters, calibrations or the like overlap the indicating portion of the pointer.

In addition, according to a second aspect of the present invention, the display device includes that the polarizing direction of the dial is circumferentially oriented while maintaining the concentric relationship as seen from the central part of the dial and that the polarizing direction of the pointer is oriented at a right angle relative to the indicating portion of the pointer.

Additionally, according to a third aspect of the present invention, the display device includes that the polarizing direction of the dial is circumferentially oriented while maintaining the concentric relationship as seen from the central part of the dial, that a substantially half part of the pointer including the indicating portion of the pointer is oriented at a right angle relative to the indicating portion of the pointer and that the other remaining part of the pointer is radially oriented from the central part toward the outer peripheral part thereof.

Further, according to a fourth aspect of the present invention, the display device includes that the polarizing direction o the dial is circumferentially oriented while maintaining the concentric relationship as seen from the central part of the dial and that the polarizing direction of the pointer is radially oriented from the central part toward the outer peripheral part of the pointer.

Since the display device of the present invention is constructed in the above-described manner, when a light source is turned on, characters, calibrations or the like on a dial can clearly visually be recognized via a pointer composed of a polarizing plate, whereby it can visually be confirmed that an indicating portion on the pointer indicates a predetermined position. In addition, when the light source is turned on, not only the characters, calibrations or the like on the dial but also the limited region inclusive of the position where the characters, the calibrations or the like overlap the indicating portion of the pointer can brightly visually be recognized in such a state that the light beam emitted from the light source permeates through them.

BRIEF DESCRIPTION OF THE PREFERRED EMBODIMENTS

Now, the present invention will be described in detail hereinafter with reference to the accompanying drawings which illustrate preferred embodiments of the present invention.

Figure 1:
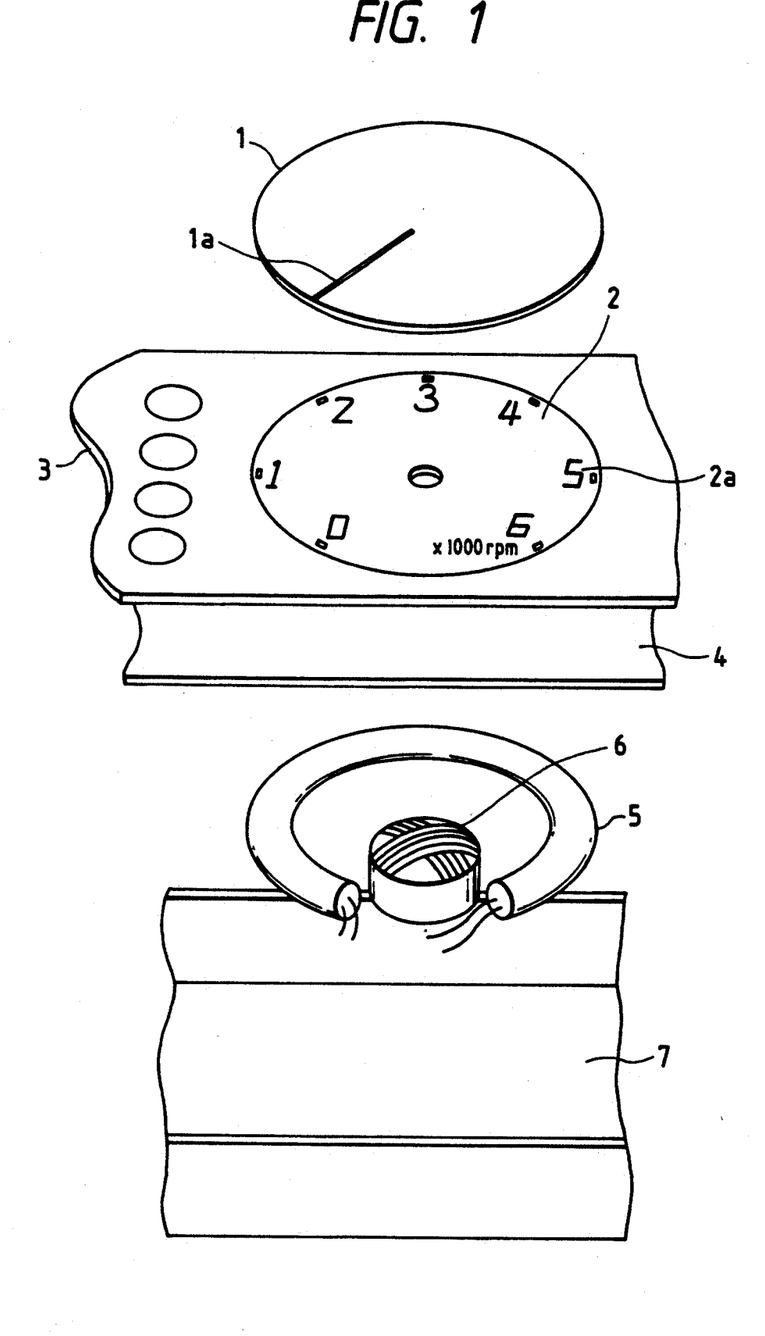
FIG. 1 is a perspective view of a display device for a vehicle in accordance with a first embodiment of the present invention which illustrates the structure of the display device in the disassembled state.

FIG. 1 is a perspective view which illustrates a display device for a vehicle in accordance with a first embodiment of the present invention in the disassembled state. In the drawing, reference numeral 1 designates a circular disc-shaped pointer. The pointer 1 includes a slit-shaped indicating portion 1a which radially extends from the central part toward the outer peripheral part thereof. Reference numeral 2 designates a dial. The dial 2 exhibits the same circular contour as that of the pointer 1 while having the substantially same diameter as that of the pointer 1. In addition, the dial 2 includes characters and calibrations 2a around the outer peripheral part thereof, and a hole through which a pointer shaft extends to turn the pointer 1 is drilled through the central part of the dial 2. As is apparent from the drawing, the dial 2 is supported in such a state that it is fitted into a panel 3. Reference numeral 4 designates a light scattering plate which serves so as to allow the light emitted from a light source 6 to be uniformly scattered to the outside. Reference numeral 6 designates a movement which serves to turn the pointer 1. In addition, reference numeral 7 designates a case.

Figure 2:
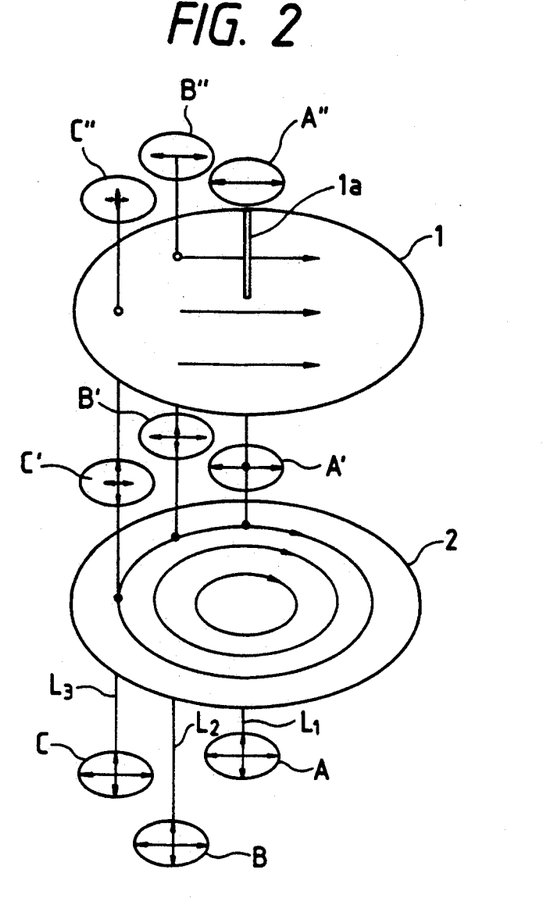
FIG. 2 is a perspective view of the display device, particularly illustrating the contour of a dial and a pointer as well as the polarizing direction.
Figure 3:
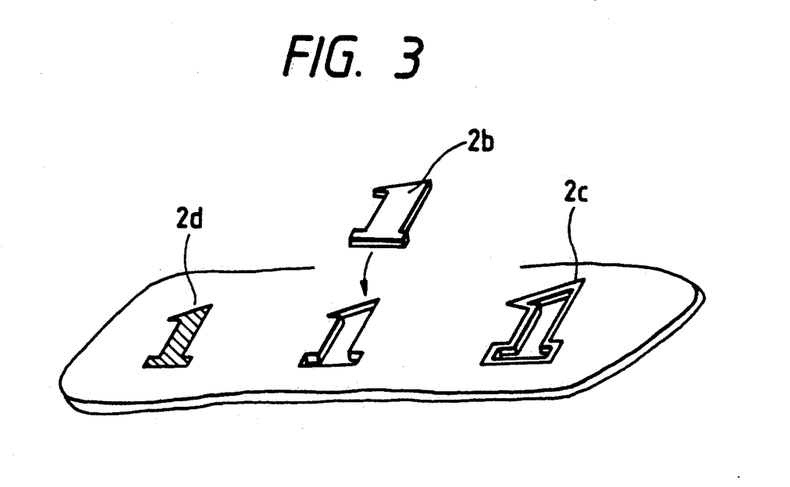
FIG. 3 is a perspective view which illustrates arrangement of characters on the dial.

The pointer 1 is constructed of a polarizing plate. As shown in FIG. 2, the polarizing direction of the pointer 1 is oriented at a right angle relative to the direction of the indicating portion 1a as represented by arrow marks. It should be noted that the indicating portion 1a of the pointer 1 is coated with a black color without any polarizing property but it may be coated with another color. The dial 2 is likewise constructed of a polarizing plate, and the polarizing direction of the dial 2 is oriented in the circumferential direction as represented by arrow marks while maintaining the concentrical relationship as seen from the central part of the dial 2. As shown in FIG. 2, the characters 2a on the dial 2 are prepared such that they are punched out through the dial 2 and the punched cutouts are then filled with colored articles 2b. Alternatively, each punched cutout may be coated or lined with a framing member 2c. Otherwise, each character 2a may be coated with a black-colored substance 2d.

As the dial 2 is illuminated with the light beam emitted from the back side thereof, i.e., the light source 5, a light beam A passing along a line $L_1$ is polarized as represented by A' after it permeates through the dial 2, and moreover, it is additionally polarized as represented by A" after it permeates through the pointer 1. In addition, a light beam b passing along a line $L_2$ is polarized as represented by B' after it permeates through the dial 2, and moreover, it is additionally polarized as represented by B" after it permeates through the pointer 1. Further, a light beam C passing along a line $L_3$ is polarized as represented by C' after it permeates through the dial 2, and moreover, it is additionally polarized as represented by C" after it permeates through the pointer 1. In other words, after the light beam passing along the line $L_1$ permeates through the dial 2 and the pointer 1, it is polarized in the same polarizing direction, causing a large quantity of light beam to permeate through them. On the contrary, the polarizing direction of the light beam passing along the line $L_3$ after it permeates through the dial 2 is oriented at a right angle relative to the direction of the light beam after it permeates through the pointer 1, causing few light beam to permeate through them. With respect to the light beam passing along the line $L_2$, an intermediate quantity of light beam permeates through the dial 2 and the pointer 1. In the following Figures, the length of the arrow shows the strength of the beam light.

Figure 4:
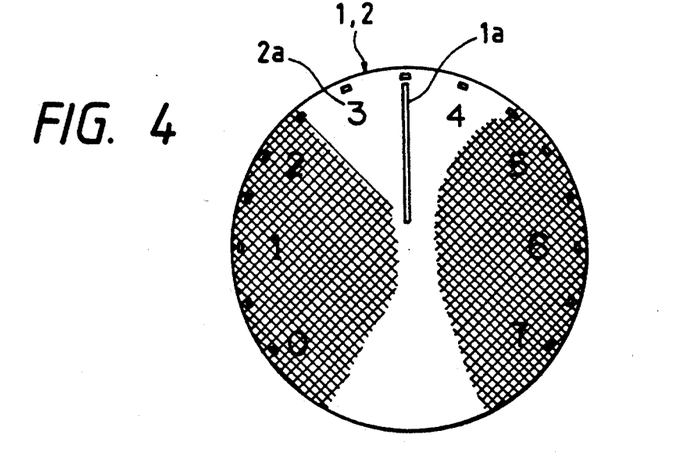
FIG. 4 is a diagrammatical view of the display device as seen from the pointer side, particularly illustrating the state that the dial is illuminated with the light beam emitted from the back side of the dial while the dial and the pointer are combined with each other.

FIG. 4 illustrates the aforementioned polarized state as the pointer 1 is practically visually observed from the front side of the display device. As is apparent from the drawing, the limited region inclusive of the indicating portion 1a of the pointer 1 overlapping the dial 2 is brightly illuminated, and the indicating portion 1a of the pointer 1 located in the foregoing limited region can clearly visually be recognized with a black color or the like. As the pointer 1 is turned, the bright part and the dark part are turnably displaced corresponding to the turning movement of the pointer 1. When the characters 2a are painted with a specific color, they are illuminated with the same color as that of the characters 2a. When they are painted with a black color, the characters intersecting the indicating portion 1a of the pointer 1 can clearly be recognized with the black color.

Figure 5:
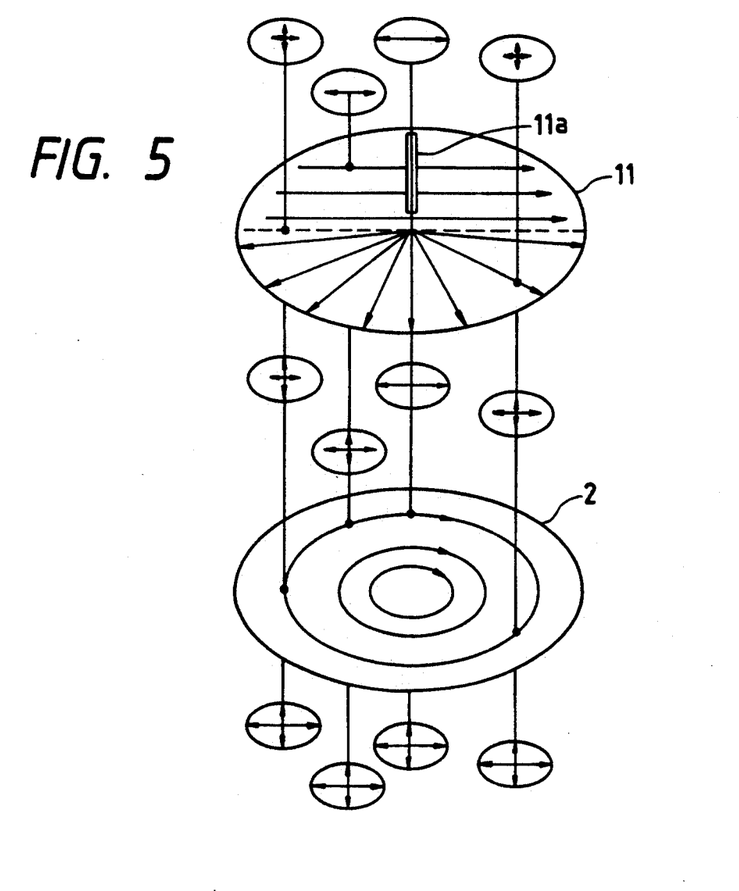
FIG. 5 is a perspective view of a display device for a vehicle in accordance with a second embodiment of the present invention, particularly illustrating the structure of a dial and a pointer as well as the polarizing direction.

FIG. 5 is a perspective view which schematically illustrates a display device for a vehicle including a pointer 11 and a dial 2 in accordance with a second embodiment of the present invention. This embodiment is concerned with the case that the pointer 11 having a polarizing direction different from that of the pointer 1 in the first embodiment is employed for the display device. Specifically, one half of the pointer 11 including an indicating portion 11a is polarized in the direction at a right angle relative to the indicating portion 11a, while the other half of the same is polarized in the radial direction relative to the central part of the pointer 11. With such construction, as the dial 2 is illuminated with the light beam emitted from the backside of the dial 2, i.e., the light source, a large quantity of light beam permeates through the limited region inclusive of the indicating portion 11a of the pointer 11 but few light beam permeates through the fore region where the light beam is polarized in the radial direction because the radial polarizing direction is oriented at a right angle relative to the polarizing direction of the dial 2.

Figure 6:
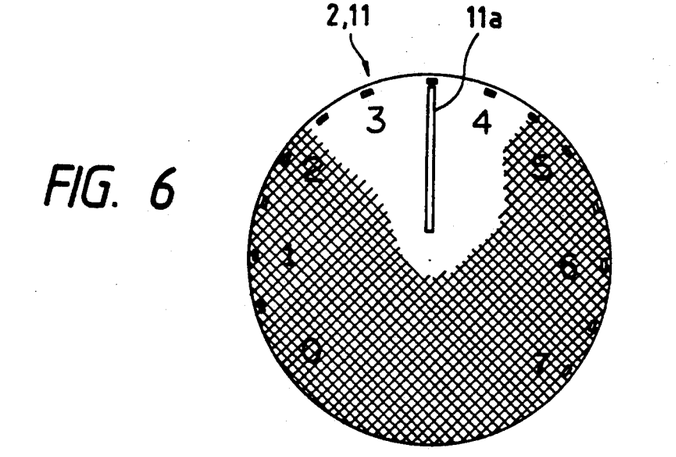
FIG. 6 is a diagrammatical view of the display device as seen from the pointer side, particularly illustrating the state that a dial is illuminated with the light beam emitted from the back side of the dial while the dial and the pointer are combined with each other as shown in FIG. 5.
Figure 7A:
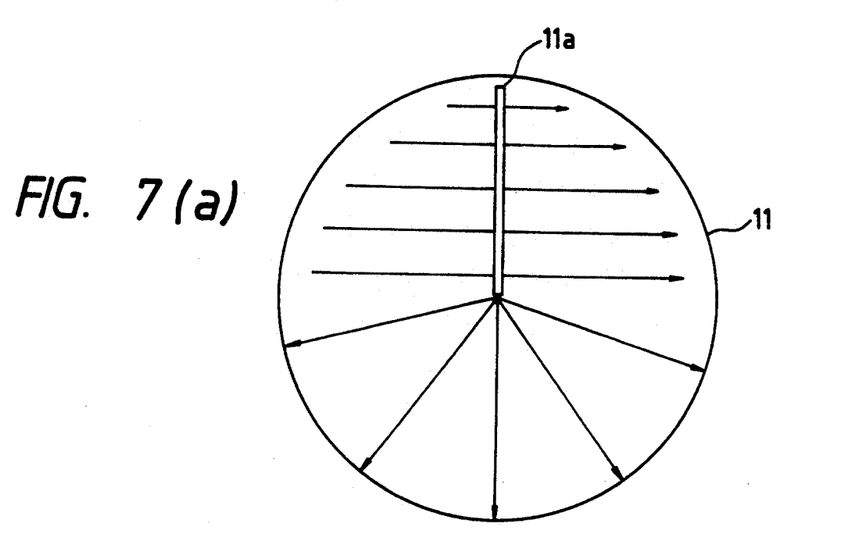
FIG. 7(a) is a front view of the display device, particularly illustrating the polarizing direction of the pointer.
Figure 7B:
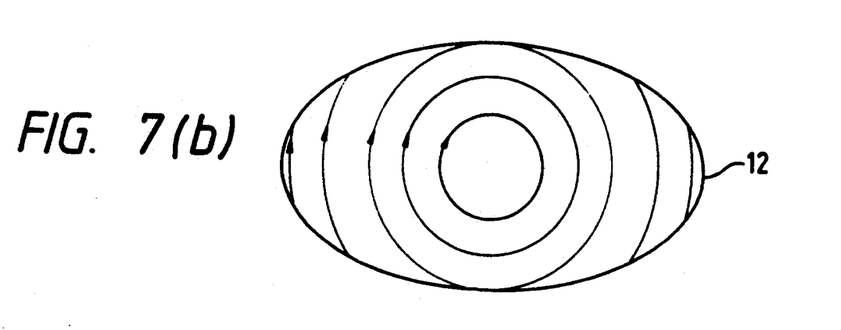
FIG. 7(b) is a front view of the elliptical dial, particularly illustrating the polarizing direction of the dial.
Figure 8:
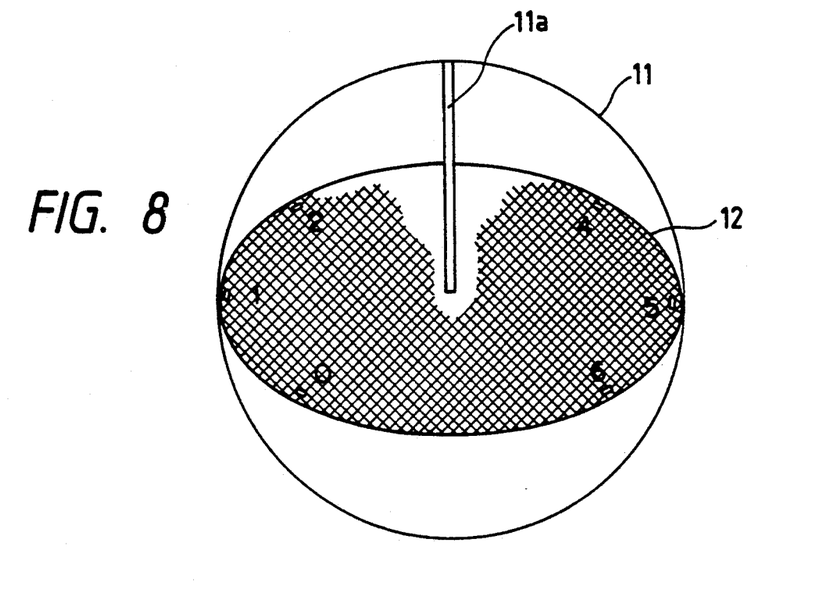
FIG. 8 is a diagrammatical view of the display device as seen from the pointer side, particularly illustrating the state that the dial is illuminated with the light beam emitted from the back side of the dial while the dial and the pointer are combined with each other as shown in FIG. 7.

As shown in FIG. 6, when the foregoing state is visually recognized from the front side of the pointer 11, the limited region inclusive of the indicating portion 11a of the pointer 11 is brightly illuminated. Thus, the indicating portion 11a of the pointer 11 located in the foregoing limited region can clearly be recognized with a black color or the like. As the pointer 11 is turned, the bright part and the dark part are turnably displaced corresponding to the turning movement of the pointer 11. According to this embodiment, a different point from the device in accordance with the first embodiment of the present invention consists in that the limited region located symmetrically relative to the indicating portion 11a with the central part of the pointer 11 interposed therebetween is not brightly illuminated in contrast with the first embodiment wherein the region located symmetrically relative to the indicating portion 1a with the central part of the pointer 1 interposed therebetween is brightly illuminated. With this construction, visual recognizability can be improved. It should be added that it is possible to design the dial 12 in the elliptical contour while the contour of the pointer 11 is left unchanged, as shown in FIG. 7(a) and FIG. 7(c). In this case, as shown in FIG. 8, while the pointer 11 overlaps the dial 12, the limited region inclusive of the indicating portion 11a is brightly illuminated but the other remaining region is kept dark.

Figure 9:
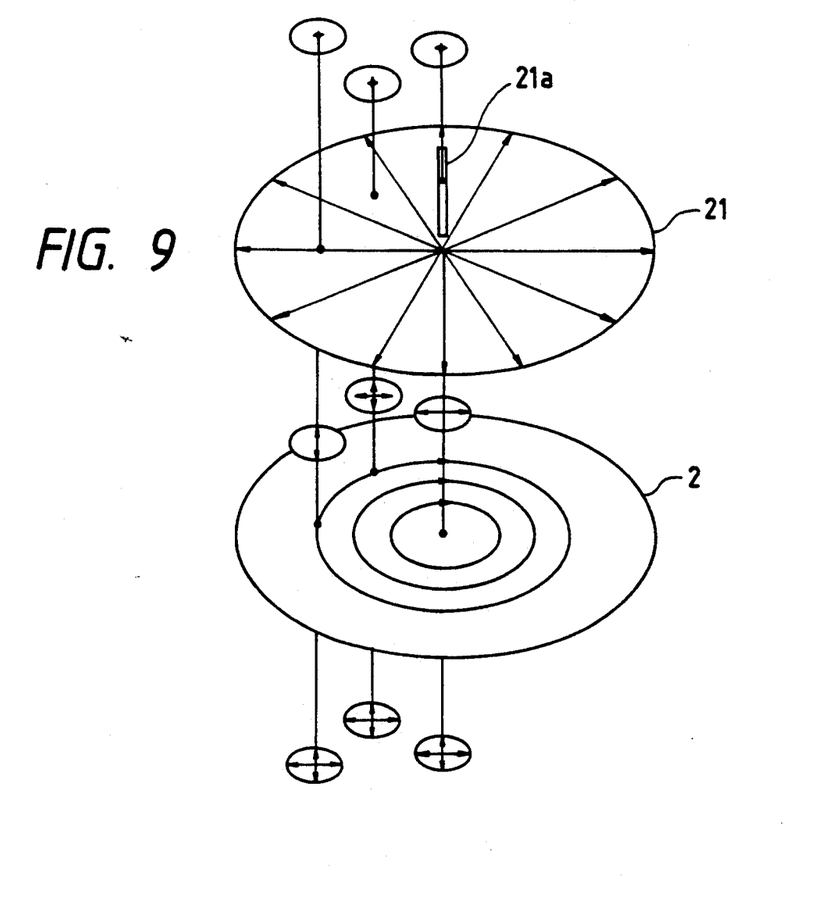
FIG. 9 is a perspective view of a display device for a vehicle in accordance with a third embodiment of the present invention, particularly illustrating the structure of a dial and a pointer as well as the polarizing direction of the pointer.

FIG. 9 is a perspective view of a display device for a vehicle in accordance with a third embodiment of the present invention wherein a pointer 21 and a dial 2 are illustrated in the disassembled state. In this embodiment, the dial 2 is designed in the same manner as that in the first embodiment wherein the polarizing direction is oriented in the circumferential direction while maintaining the concentrical relationship as seen from the central part of the dial 2, and characters, calibrations 2a or the like are punched out through the dial 2 while the punched cutouts are filled with colored substances 2b. Alternatively, each of the punched cutouts may be lined with a framing member 2c. With this construction, the characters, the calibrations 2c or the like do not have any polarizing property. The circular disc-shaped pointer 21 is constructed such that the polarizing direction is oriented in the radial direction with the central part thereof as a start point, and moreover, a slit-shaped indicating portion 21a is punched out through the pointer 21 while the punched cutout of the indicating portion 21a is filled with a coloring substance. Alternatively, the punched cutout of the indicating portion 21 may be kept open. In any case, the indicating portion 21a does not have a polarizing property.

Figure 10:
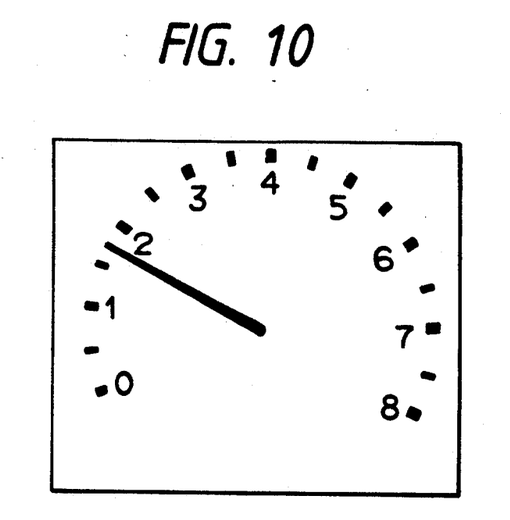
FIG. 10 is a diagrammatical view of the display device as seen from the pointer side, particularly illustrating the state that the dial is illuminated with the light beam emitted from the back side of the dial while the dial and the pointer are combined with each other as shown in FIG. 9.

When the dial 2 is illuminated with a light beam emitted from the backside of the device, i.e., the light source, the characters, the calibrations 2a and indicating portion 21a of the pointer 21 are brightly illuminated while the background is kept dark as shown in FIG. 10, since the polarizing direction of the dial 2 intersects the polarizing direction of the pointer 21 at a right angle at all positions. It should be noted that since the light beam which has passed through the characters and the calibrations 2a without any polarization is polarized by the pointer 21 and the light beam which has passed through the indicating portion 21a of the pointer 21 is polarized by the dial 2, they are visually recognized in the darkened state by a quantity equivalent to the permeating rate associated with the characters, the calibrations 2a and the indicating portion 21a of the pointer 21.

Figure 11:
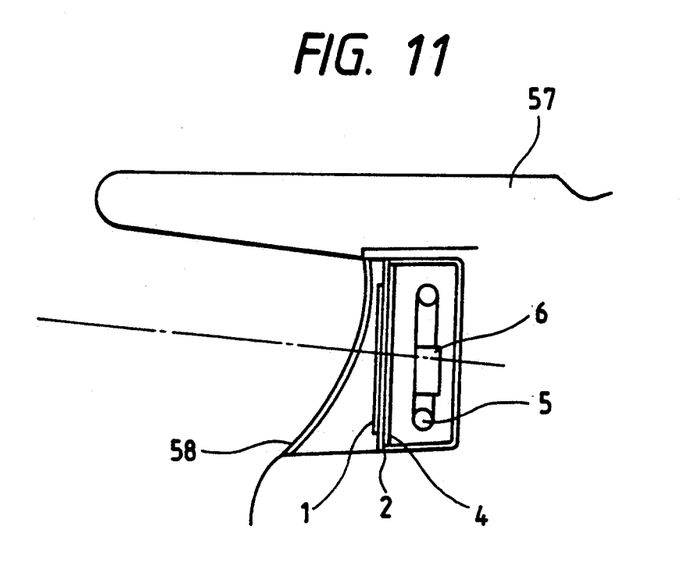
FIG. 11 is a fragmentary side view of the display device, particularly illustrating the state that the display device of the present invention is incorporated in an instrument panel on the vehicle.

FIG. 11 is a fragmentary side view which illustrates the state that the display device of the present invention is incorporated in an instrument panel 57. In the drawing, reference numeral 58 designates a meter hood and reference numeral 59 designates a front glass.

Figure 12:
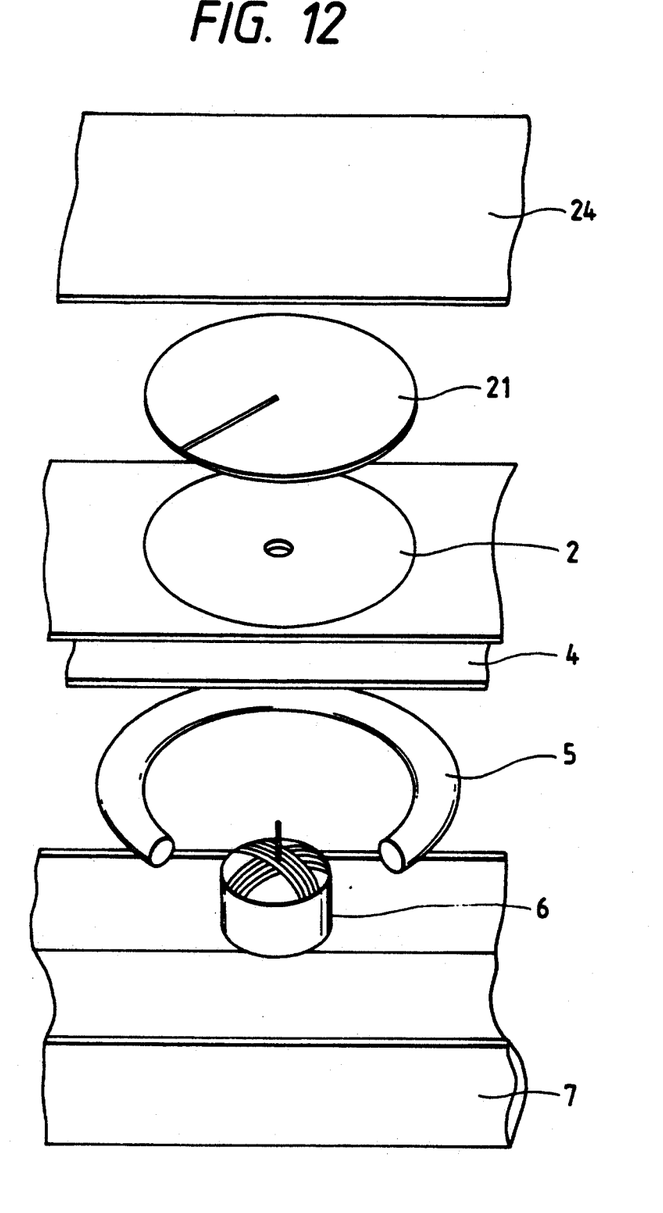
FIG. 12 is a perspective view of a display device for a vehicle in accordance with a fourth embodiment of the present invention, particularly illustrating essential components for the display device in the disassembled state.
Figure 13:
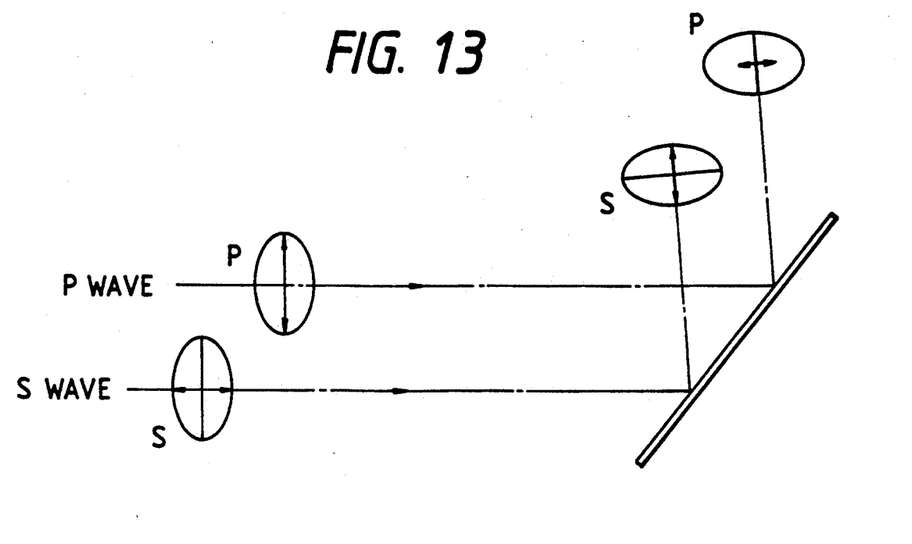
FIG. 13 is a diagrammatical view which schematically illustrates how a reflective index varies dependent on the polarizing direction.

FIG. 12 is a perspective view of a display device for a vehicle in accordance with a fourth embodiment of the present invention, particularly illustrating essential components for the display device in the disassembled state. This display device is intended to visually recognize an image to be displayed as a virtual image. Specifically, this display device is constructed such that a light scattering plate 24 is arranged in front of a pointer 21 which corresponds to the pointer 21 of the display device in accordance with the third embodiment of the present invention as shown in FIG. 9. A characterizing feature of this display device consists in that a polarizing property of the display device can be altered by scattering both the polarized light beams with the aid of the light scattering plate 24 based on the fact that the light beam passing through characters 2a or the like and the light beam passing through an indicating portion 21a of a pointer 2 are polarized with a polarizing direction different from each other. When a P wave and an S wave both of which are polarized are incident on a reflector (having semitransparency) at a predetermined angle as shown in FIG. 13, there appears a phenomenon that a reflective index of the P wave vibrating in parallel with the incident surface is reduced less than a reflective index of the S wave vibrating in the direction at a right angle relative to the incident surface. Because of the foregoing phenomenon, there is a possibility that the dial 2 is displayed with fluctuation in brightness as the pointer 21 is turned. In practice, the scattering plate 24 is arranged in front of the pointer 21 so as to obviate the aforementioned phenomenon. When a degree of cloudedness of the scattering plate 24 is excessively increased, the dial 2 is displayed with degraded optical sharpness. For this reason, it is recommendable that a scattering plate 24 having a lowest possibility of changing a polarizing property is employed for the display device.

Figure 14:
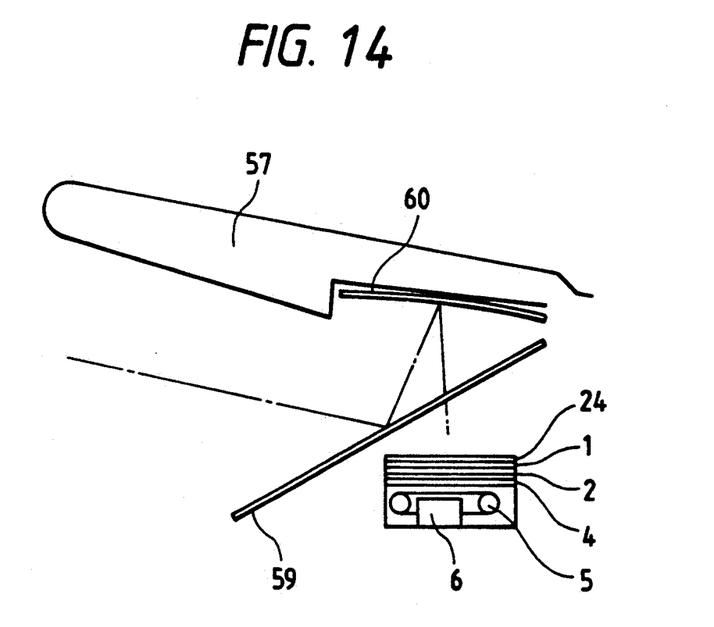
FIG. 14 is a fragmentary side view of the display device, particularly illustrating the state that the display device shown in FIG. 12 is incorporated in an instrument panel on the vehicle as a virtual image type display device.

FIG. 14 is a fragmentary side view which schematically illustrates the state that the display device in accordance with the fourth embodiment of the present invention is incorporated in an instrument panel 57 on the vehicle. The display surface of the display device is oriented in the upward direction, and a translucent reflector 59 and a mirror 60 are arranged on the instrument panel 57 of the vehicle. With such construction, a light beam once permeates through the reflector 59, and it is then reflected by the mirror 60. Subsequently, the reflected light is reflected by the reflector 59 again so that it is visually recognized with driver's eyes. Thus, when the display device is observed from the driver side, an indicating portion 21a of the pointer 2 and characters 2a on the dial 2 are visually recognized as virtual images as if they are located at the position behind the reflector 59.

As is apparent from the above description, according to the present invention, since the display device is basically composed of a dial and a circular disc-shaped pointer each of which is constructed of a polarized plate, the pointer and characters, calibrations or the like on the dial can overlap each other. With this construction, the characters, calibrations or the like can be displayed with large dimensions within the range having a small space with the result that visual recognizability can be improved, and moreover, a degree of freedom of designing can substantially be increased.

What is claimed is:

1. A display device comprising:
   a dial having a character portion arranged on an outer circumference portion thereof;
   a circular disk-shaped pointer disposed in front of said dial, said circular disk-shaped pointer including a slit-shaped indicating portion radially extending from a central portion to an outer peripheral portion of said circular disk-shaped pointer, an outer peripheral portion of said slit-shaped indicating portion covering said character portion on said dial;
   a light source arranged behind said dial to illuminate said dial and said circular disk-shaped pointer; and
   a driving source for driving said circular disk-shaped pointer,
   wherein said pointer is constructed of a polarizing plate with a first predetermined polarizing direction exclusive of said indicating portion of said pointer, said dial having a portion defined by overlapping said dial and said pointer, wherein said dial is constructed of a polarizing plate having a second predetermined polarizing direction exclusive of said character portion and wherein a light beam emitted from said light source passes through said portion defined by overlapping said slit-shaped indicating portion and said character portion.

2. A display device as claimed in claim 1, wherein said second predetermined polarizing direction is concentrically formed from a central part of said dial to an outer peripheral portion of said dial.

3. A display device as claimed in claim 2, wherein said first predetermined polarizing direction is orthogonal to a radial direction of said pointer.

4. A display device as claimed in claim 2, wherein said first predetermined polarizing direction is defined by a first direction of a first half portion of said pointer including said slit-shaped indicating portion of said pointer, being orthogonal to a radial direction of said pointer and a second direction of a second half portion of said pointer being radially formed from a central portion of said pointer toward said outer peripheral part of said pointer.

5. A display device as claimed in claim 2, wherein said first polarizing direction of said pointer is radially formed from said central part toward said outer peripheral portion of said pointer.

6. A display device as claimed in claim 1, further comprising:
   a light scattering plate disposed in front of said circular disk-shaped pointer.

* * * * *